(12) United States Patent
Imai et al.

(10) Patent No.: US 6,334,461 B1
(45) Date of Patent: Jan. 1, 2002

(54) SOLENOID OPERATED VALVE

(75) Inventors: Masayuki Imai; Hitoshi Kibune, both of Tokyo (JP)

(73) Assignee: Fujikoki Corp., Tokyo (JP)

( * ) Notice: Subject to any disclaimer, the term of this patent is extended or adjusted under 35 U.S.C. 154(b) by 0 days.

(21) Appl. No.: 09/436,452

(22) Filed: Nov. 8, 1999

(30) Foreign Application Priority Data

Nov. 9, 1998 (JP) .................................................. 10-317912
Jun. 2, 1999 (JP) .................................................. 11-154546

(51) Int. Cl.[7] ............................. B01D 35/04; F16K 31/06
(52) U.S. Cl. ....................................... 137/549; 251/129.15
(58) Field of Search ...................................... 137/549, 550, 137/454.2, 454.6; 251/129.07, 129.15; 335/255, 260, 278, 297

(56) References Cited

U.S. PATENT DOCUMENTS

| | | | | |
|---|---|---|---|---|
| 3,326,511 A | * | 6/1967 | Hallgreen | ................ 251/129.15 |
| 5,752,689 A | | 5/1998 | Barkhimer et al. | |
| 5,865,213 A | * | 2/1999 | Scheffel et al. | ..... 251/129.15 X |
| 6,003,838 A | * | 12/1999 | Beck | ........................ 251/129.15 |

FOREIGN PATENT DOCUMENTS

| | | |
|---|---|---|
| JP | 0 511 760 A1 | 11/1992 |
| JP | 09229227 | 5/1997 |
| WO | 97/06040 | * 2/1997 |

* cited by examiner

*Primary Examiner*—John Rivell
(74) *Attorney, Agent, or Firm*—Armstrong, Westerman, Hattori, McLeland & Naughton, LLP

(57) ABSTRACT

A solenoid operated valve 10' comprises a coil 21, a suction element 24, a plunger 31, a spring 25, a valve member 26, a bobbin 22, a housing 27 and a cap 28, wherein the plunger 31 is moved toward the suction element 24 when electricity is supplied to the coil 21. A pipe sleeve 30 is formed as a deep-drawn integrated pipe with a bottom, which is inserted to the inner side of the bobbin 22, and to which the suction element 24 is inserted and fixed. The plunger 31 is slidably inserted to the pipe sleeve 30. The valve member fixed to the end of plunger 31 opens or closes a valve opening 32. A cylindrical filter is fit to the outer peripheral of a flow-in opening 33, and assembled to a corresponding member.

11 Claims, 7 Drawing Sheets

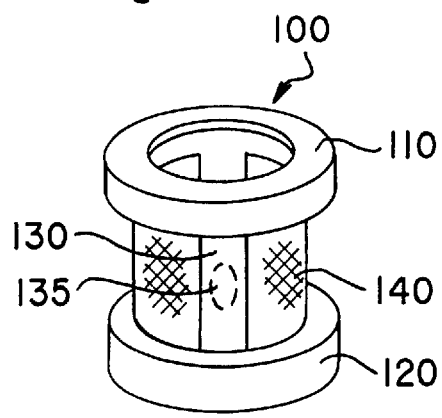
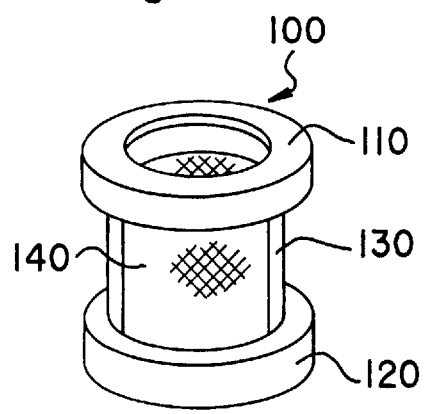
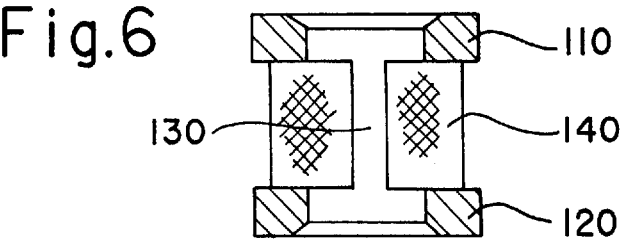
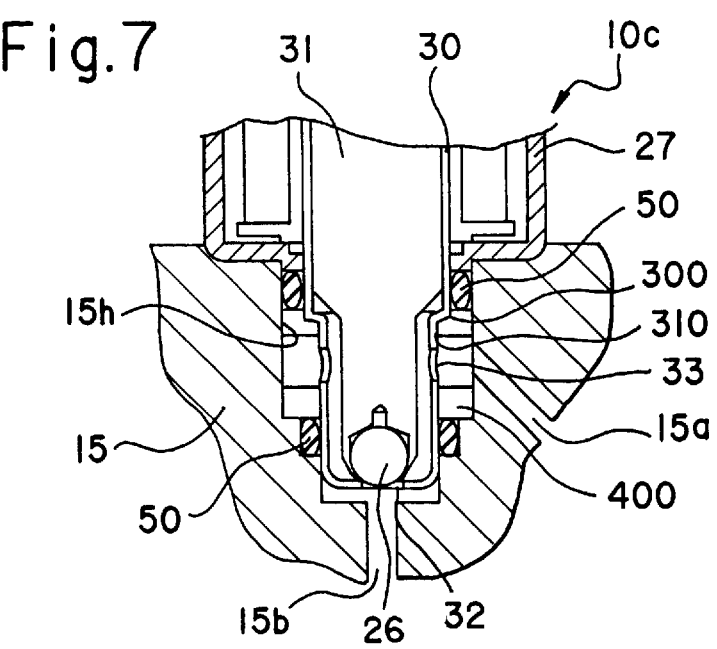

SOLENOID OPERATED VALVE

FIELD OF THE INVENTION

The present invention relates to a solenoid operated valve, and particularly, to a solenoid operated valve preferably used in a variable capacity compressor.

DESCRIPTION OF THE RELATED ART

One example of a priorly known solenoid operated valve being used in a variable capacity compressor is disclosed in Japanese Laid-Open Patent Publication No. S63-147978, and FIG. 13 is a cross-sectional view showing the structural outline of the prior art valve mounted to a compressor.

As shown in FIG. 13, a solenoid operated valve 10 is sandwiched between side plates 15 and 16 of the compressor, and a body 17 of the valve 10 is mounted through o-rings 13 and 14 to a plate 15 of the compressor. A pressure induction hole 18 and a pressure discharge hole 19 are formed in the body 17. A valve member 26 for opening and closing the pressure induction hole 18 and the pressure discharge hole 19 are provided in the valve 10, and the valve member 26 is crimped onto the end of a plunger 20. The plunger 20 is slidably inserted into a plunger pipe 23 formed in the interior of an electromagnetic coil 21. A suction element 24 is positioned so as to oppose the plunger 20. The suction element 24 is also stored in the interior of the electromagnetic coil 21, and fit to the plunger pipe 23.

A spring 25 is mounted between the suction element 24 and the plunger 20. The spring 25 biases the plunger 20 away from the suction element 24. In other words, the force of the spring 25 pushes the valve member 26 in the direction to close the pressure discharge hole 19. A steel housing 27 is mounted to. the exterior of the electromagnetic coil 21. A steel cap 28 is crimped onto the upper end of the housing 27, and the cap 28 is fit into and fixed to the side plate 16.

One end of a lead wire of the electromagnetic coil 21 is electrically connected to a connector 29. The other end of the connector is not shown. FIG. 13 shows the state where the power is not supplied to the electromagnetic coil 21, and the valve is closed.

SUMMARY OF THE INVENTION

According to the solenoid operated valve of prior art, the body and the plunger pipe are formed as separate units. Therefore, it was difficult to obtain coaxiality between the body and the plunger, which leads to problems such as valve leakage or operation failure due to deflection of the valve member.

Further, since the body and the plunger pipe of the conventional solenoid operated valve are separate, the manufacturing cost of the valve is relatively expensive.

Moreover, since the body and the plunger pipe are formed separately and there is a need to assemble the separate members, dispersion is likely to occur between the lift of the plunger and the lift of the valve member. This leads to unstabilized suction power and unstabilized open valve flow, which results in the lack of capability of the variable capacity compressor.

The present invention aims at solving the above problems. The object of the present invention is to utilize a pipe sleeve with a bottom formed by deep drawing, which constitutes the body and the plunger pipe integrally. Thereby, a solenoid operated valve having improved reliability and performance, and with no valve leakage or motion troubles may be provided.

Another object of the present invention is to provide a solenoid operated valve having accurate suction force and flow rate of the plunger, which leads to stabilized variability of the variable capacity compressor.

Yet another object of the present invention is to provide a valve with improved magnetic properties and a reduced number of members to be assembled.

In order to achieve the above objects, the present invention provides a solenoid operated valve in which a suction element is attracted by an electromagnetic coil, comprising a body and a plunger pipe being integrally formed as a pipe sleeve to which said suction element is inserted and fixed, and a plunger slidably mounted within said pipe sleeve and including a valve member, wherein said pipe sleeve is formed by deep drawing to include a bottom portion, and a valve opening is equipped to said bottom portion.

Further, the embodiment of the present solenoid operated valve includes forming a step portion to the pipe sleeve, and to press-fit a filter to the pipe sleeve which stops at the step portion, thereby being fixed to the pipe sleeve.

Moreover, according to another embodiment of the present solenoid operated valve, a filter is mounted to the flow-in opening of the pipe sleeve.

According to the valve of the present invention, the plunger pipe and the body are formed integrally as a deep-drawn pipe sleeve with a bottom, which is different from the prior art valve in which the plunger pipe and the body are formed as separate members. According to the structure of the present invention, the coaxiality of the valve will be improved, and deflection of the valve member equipped in the plunger may be prevented, thereby improving the performances and reliability of the valve.

Even further, since the plunger pipe and the body are integrally formed as one unit, the number of members to be assembled is reduced, and the dispersion of the lift of the valve member and the plunger during assembly may be reduced, which leads to obtaining an accurate flow rate of the valve.

Moreover, since the pipe sleeve is formed as a deep-drawn integrated pipe with a bottom, the filter may be accurately mounted to the pipe sleeve.

BRIEF DESCRIPTION OF THE DRAWINGS

FIG. 5 is a perspective view showing the structure of the filter;

FIG. 6 is a cross-sectional view showing the structure of the filter;

FIG. 7 is a cross-sectional view showing another embodiment of the valve according to the present invention;

DETAILED DESCRIPTION OF PREFERRED EMBODIMENTS

A preferred embodiment of the solenoid operated valve according to the present invention is explained hereinafter with reference to the accompanied drawings. The elements corresponding to those of the prior art example and having the same functions are provided with the same reference numbers.

Figure 1:
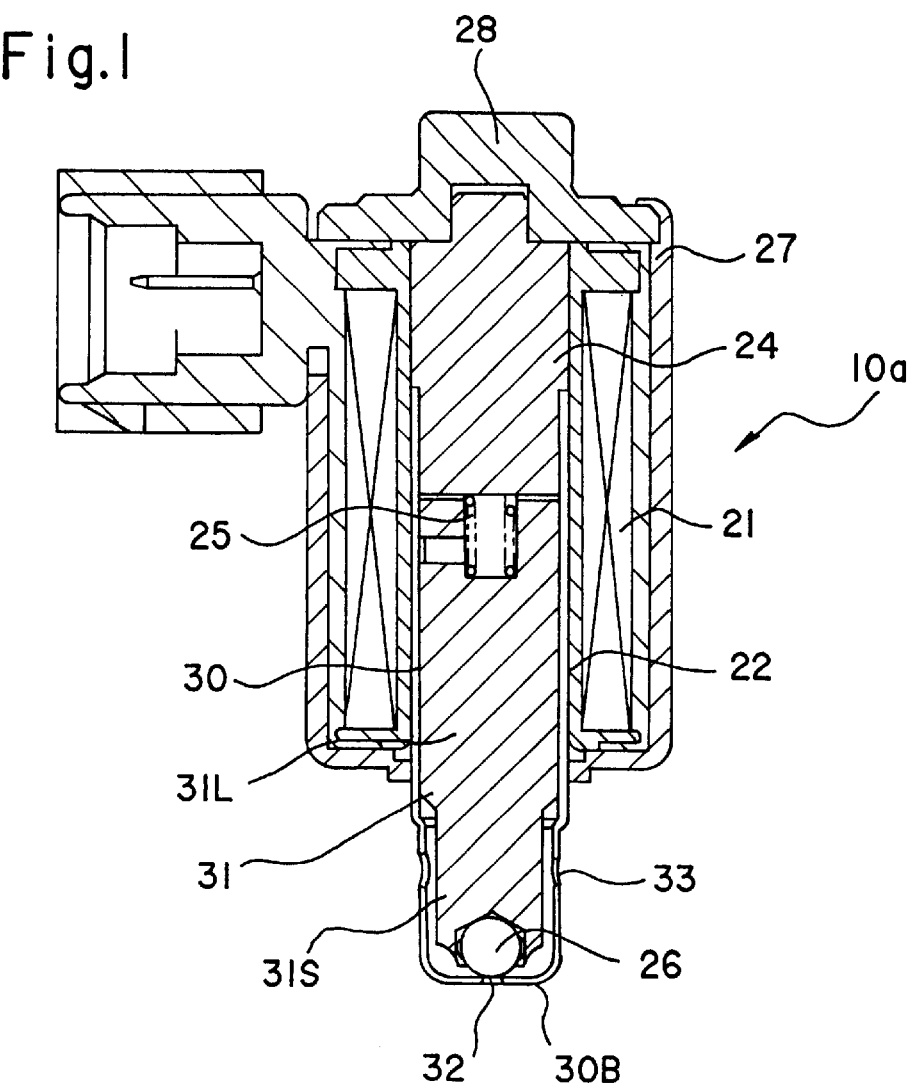
FIG. 1 is a cross-sectional view of the solenoid operated valve according to the present invention.

FIG. 1 is a vertical cross-sectional view of a solenoid operated valve 10a according to the present embodiment. The solenoid operated valve 10a basically comprises a coil 21, a suction element 24, a plunger 31, a spring 25, a valve member 26, a bobbin 22, a housing 27 and a cap 28, wherein electricity is supplied to the coil 21 to move the plunger 31 toward the suction element 24. The plunger pipe and the body of the prior art example differ from the present embodiment. That is, in FIG. 1, 30 represents a pipe sleeve, which is formed as a deep-drawn integrated pipe with a bottom. The pipe sleeve 30 of the present embodiment replaces the plunger pipe 23 and the body 17 of the prior art solenoid operated valve 10. The pipe sleeve 30 is inserted to the inner side of a bobbin 22, and a suction element 24 is inserted and fixed to the pipe sleeve 30. Further, a plunger 31 is slidably inserted to the pipe sleeve 30.

The plunger 31 is roughly constituted of a large diameter unit 31L and a small diameter unit 31S, and the small diameter unit 31S exists near a bottom portion 30B of the pipe sleeve 30. A valve member 26 is crimped and fixed to the lower end (tip) of the small diameter unit 31S, and a valve opening 32 which may be opened and closed by the valve member 26 is formed to the center of the bottom portion 30B of the pipe sleeve 30. Further, the valve opening 32 functions as a low-pressure induction hole when the valve is assembled to a variable capacity compressor not shown. FIG. 1 shows the state where the valve member 26 closes the valve opening 32. Further, as shown partially in FIG. 2, a step portion 30C is formed to the pipe sleeve 30, and the step portion 30C is positioned to correspond to the upper end area of the small diameter unit 31S. The step portion 30C is used to position a filter which will be pressed in the pipe sleeve. Further, the pipe sleeve 30 comprises a flow-in opening 33 corresponding to the small diameter unit 31S, which functions as a high-pressure induction hole when the valve 10a is assembled to the variable capacity compressor (not shown), and the small diameter unit 31S of the plunger 31 functions so as to secure the flow rate.

As explained, the solenoid operated valve 10a according to the present embodiment utilizes a pipe sleeve formed as a deep-drawn integrated pipe instead of separately forming the plunger pipe and the body. Therefore, the coaxiality of the body and the plunger will be the same, so there will be no deflection of the valve member, which increases the reliability and the performances of the valve, and shortens the assembling process. Moreover, since the present invention provides a valve where the plunger pipe and the body are not separate members, the possibility of a dispersion of the plunger and the valve member happening during the assembling process may be greatly reduced, and the flow characteristics may be set accurately.

Figure 2:
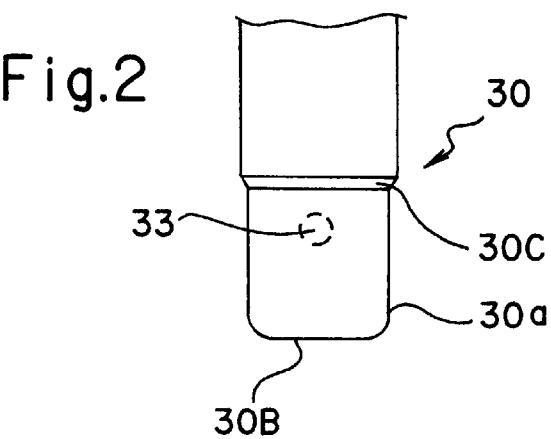
FIG. 2 is an explanatory view of the main portion of the valve according to the present invention.
Figure 3:
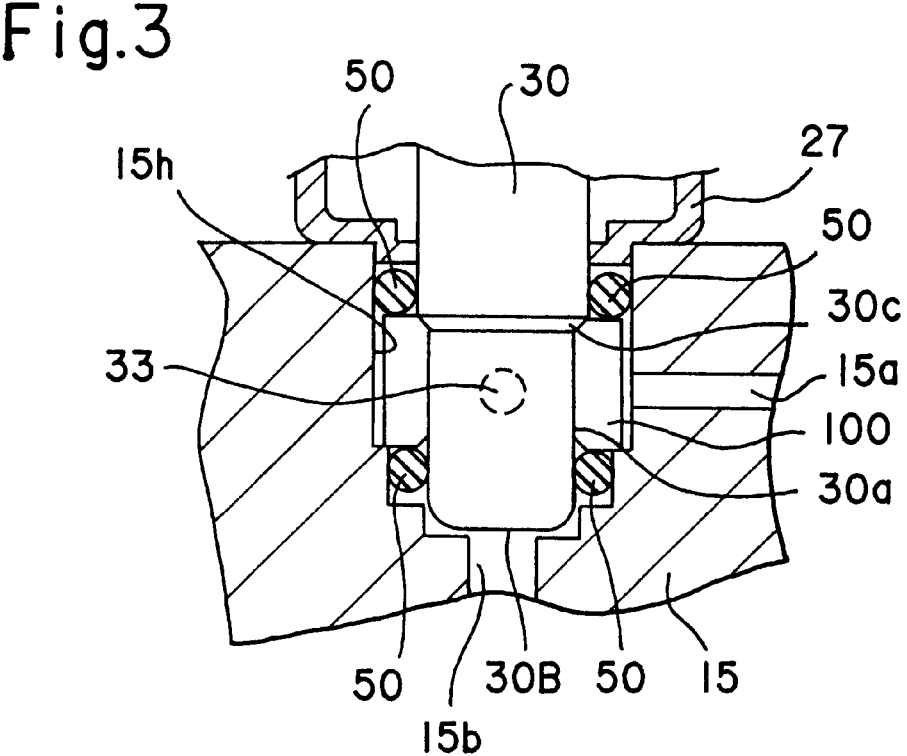
FIG. 3 is an explanatory view showing the mounting structure of the valve according to the present invention.

FIG. 3 is a vertical cross-sectional view of the solenoid operated valve 10a according to another embodiment of the present invention, showing the case where the step portion 30C formed to the pipe sleeve 30 as shown in FIGS. 1 and 2 is used to mount a filter 100 to the valve. In FIG. 3, a cylindrical filter 100 is fit to the narrowed portion 30a of the pipe sleeve 30, being positioned utilizing the step portion 30C. Seal members 50 are mounted to the upper and lower areas of the filter 100. The filter is inserted to a hole 15h formed to an assemble-object member 15, and the fluid travelling from a flow-in passage 15a is guided through the filter 100 to the flow-in opening 33 of the pipe sleeve 30. The fluid exiting from the valve opening 32 of the pipe sleeve is sent out to the exterior through a flow-out passage 15b.

Figure 4:
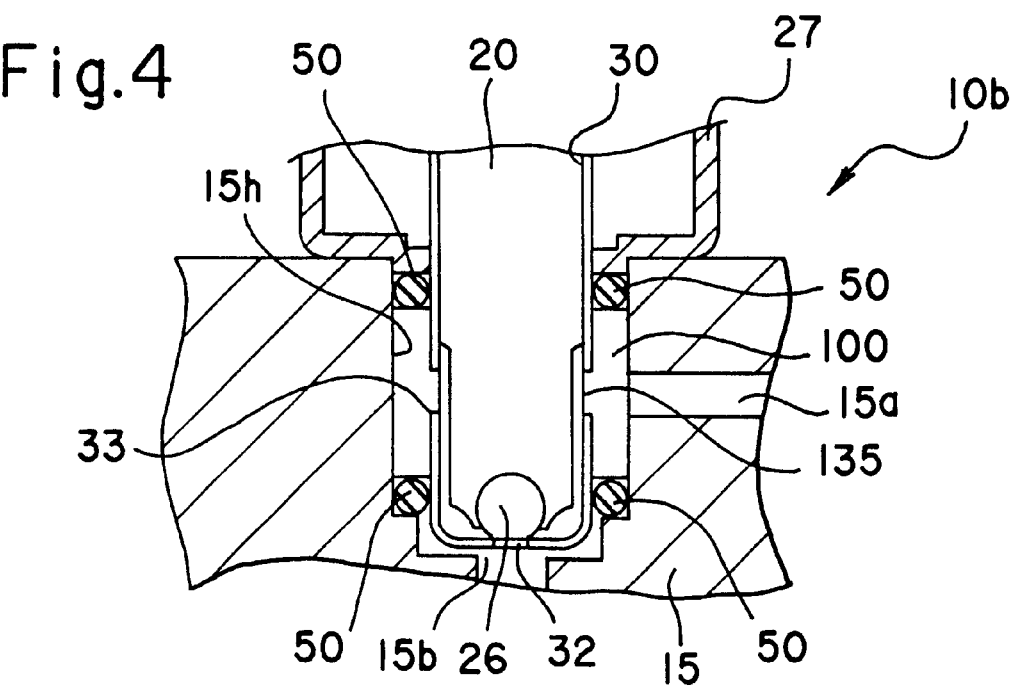
FIG. 4 is an explanatory view showing another embodiment of the valve according to the present invention.

FIG. 4 is a cross-sectional view of a solenoid operated valve 10b in which a pipe sleeve 30 is processed to have a straight shape. FIG. 5 is a perspective view and FIG. 6 is a cross-sectional view, both explaining the structure of the filter 100.

The filter 100 comprises two ring members 110 and 120 placed on both ends and being connected by two post members 130, to the inner area of which is equipped a cylindrical filter element 140. The filter is formed integrally of plastic, resin and the like.

In the center of two post members 130 is mounted an inwardly protruding protrusion 135.

When mounting the filter 100 to the pipe sleeve 30, the protrusion 135 is fit to the flow-in opening 33 of the pipe sleeve 30, and thereby, the positioning of the filter 100 to the pipe sleeve 30 is achieved. According to the structure, the filter 100 may be mounted to the predetermined position of the straight-shaped pipe sleeve 30.

FIG. 7 is a cross-sectional view of the main portion according to another embodiment of the valve of the present invention.

The solenoid operated valve 10c comprises a housing 27 inserted and fixed to an assemble-object member 15. The pipe sleeve 30 inside the housing 27 is inserted to an opening 15h of the assemble-object member 15. A flow-in passage 15a and a flow-out passage 15b is communicated to the opening 15h.

The lower end of the pipe sleeve 30 is narrowed through a step portion 300 to a narrowed portion 310. A filter 400 is fit to the outer peripheral portion of the narrowed portion 310 and the step portion 300 of the pipe sleeve 30, and a seal in the axial direction of the pipe sleeve is achieved by a seal member 50.

Figure 8C:
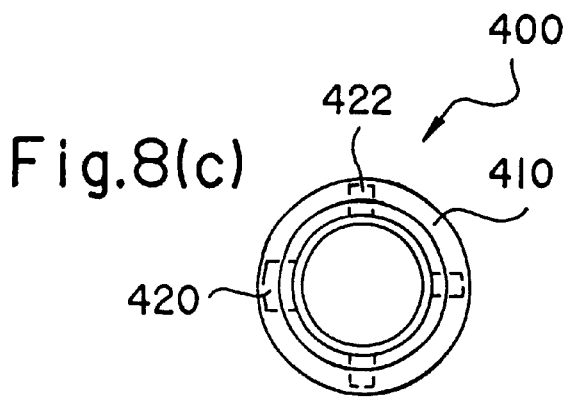
FIG. 8 is an explanatory view showing the structure of the filter.
Figure 8A:
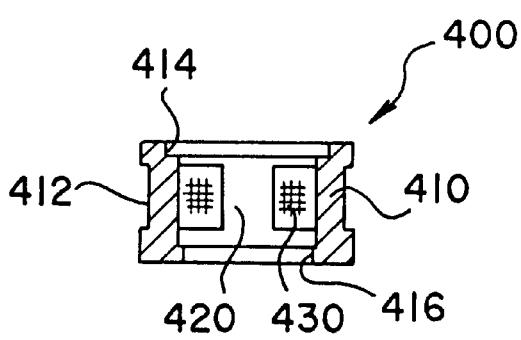
Figure 8B:
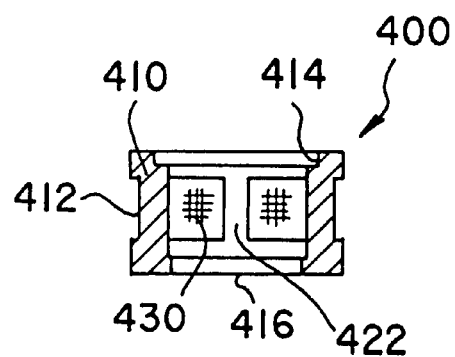

FIG. 8 shows the details of a filter 400.

The filter 400 comprises a cylindrical body 410 made of plastic. A ring-shaped groove 412 is formed to the center area of the outer peripheral of the body 410. One end of the inner circumference of body 410 is formed as a step portion 414 having a large diameter size, and the other end of the inner circumference is formed as a small diameter hole 416. The trunk portion of the body comprises an opening supported by posts 420 and 422, and a net member 430 covering the opening is equipped thereto.

When the filter 400 is fit to the pipe sleeve 30, the step portion 414 will come into contact with the step portion 300 of the pipe sleeve 30, and the filter 400 will be fixed to a predetermined position of the pipe sleeve 30.

Since the ring groove 412 is formed to the outer peripheral of the filter body 410, the fluid travelling from the flow-in passage 15a will pass through the ring groove 412 toward the circumferential direction of the filter, and will be guided through the net member 430 to the flow-in opening 33 of the pipe sleeve 30. According to the above structure, the whole region of the net member 430 may be utilized, and clogging may be prevented.

When the valve member 26 rises together with the plunger 31 and opens the valve opening 32 of the pipe sleeve 30, the fluid inside the pipe sleeve will travel through the flow-out passage 15b to the exterior.

Figure 9:
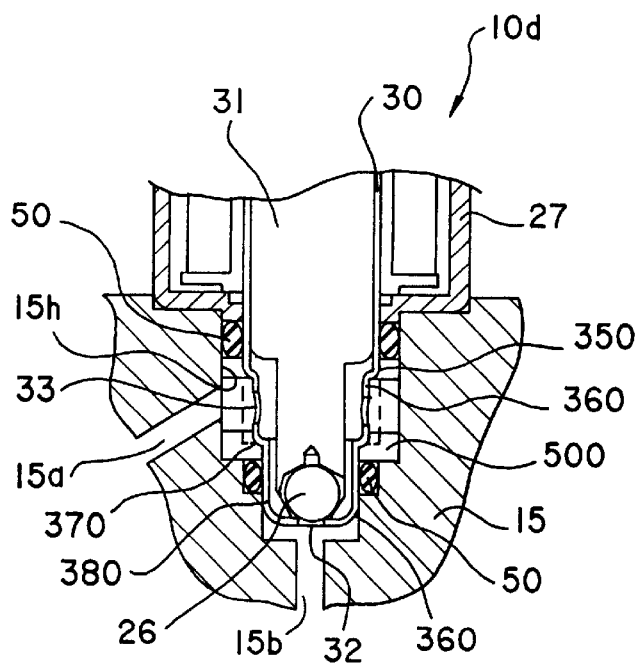
FIG. 9 is a cross-sectional view showing another embodiment of the valve according to the present invention.

FIG. 9 is a cross-sectional view showing the main portion of another embodiment according to the present invention.

The solenoid operated valve 10d comprises a housing 27 inserted and fixed to an assemble-object member 15. The pipe sleeve 30 inside the housing 27 is inserted to an opening 15h of the assemble-object member 15. A flow-in passage 15a and a flow-out passage 15b is communicated to the opening 15h.

The lower end of the pipe sleeve 30 is narrowed through a first step portion 350 to a first narrowed portion 360. The first narrowed portion 360 is further narrowed through. a second step portion 370 to a second narrowed portion 380. A filter 500 is fit to the outer peripheral portion of the second narrowed portion 380 and the step portion 350 of the pipe sleeve 30, and a seal in the axial direction of the pipe sleeve is achieved by a seal member 50.

Figure 10:
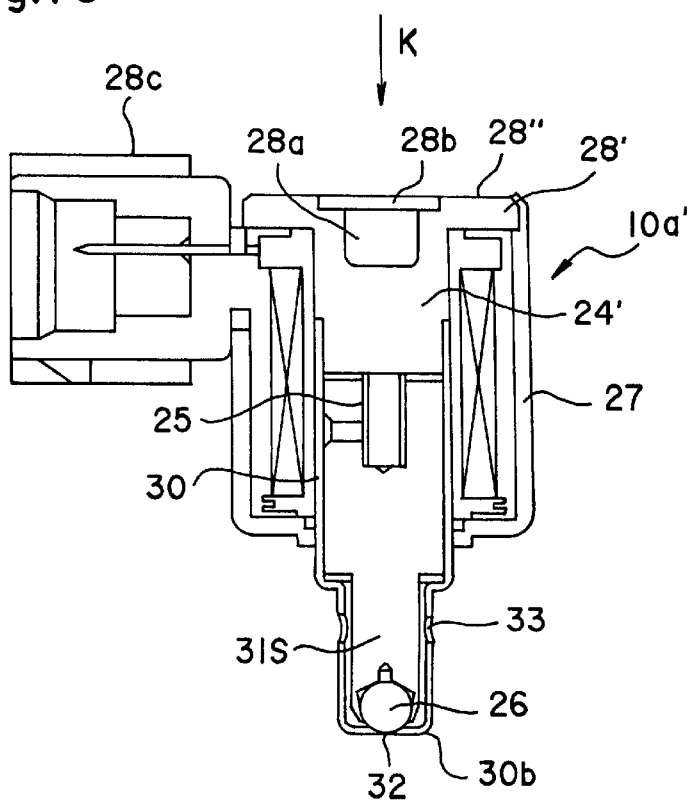
FIG. 10 is a cross-sectional view showing yet another embodiment of the valve according to the present invention.

FIG. 10 is a vertical cross-sectional view showing yet another embodiment of the solenoid operated valve according to the present invention, wherein the solenoid operated valve 10a' shown in FIG. 10 differs from the embodiment shown in FIG. 1 in the structure of the cap 28 and the suction element 24 of FIG. 1. The other structures are the same as the embodiments of FIG. 1, and the same elements are provided with the same reference numbers, and the explanation of the same elements are omitted. In FIG. 10, a cap 28' and a suction element 24' are integrally structured, and no gap exists between the cap 28' and the suction element 24'. This improves the electromagnetic characteristics of the valve. Moreover, the upper end surface of the cap 28' is formed as a flat surface 28", and a concave portion 28a is formed to the center of the flat surface. A mounting unit (protrusion) of the device to which the solenoid operated valve 10a' is fixed, for example a variable capacity compressor (not shown), maybe fixed to the concave portion 28a.

Figure 11:
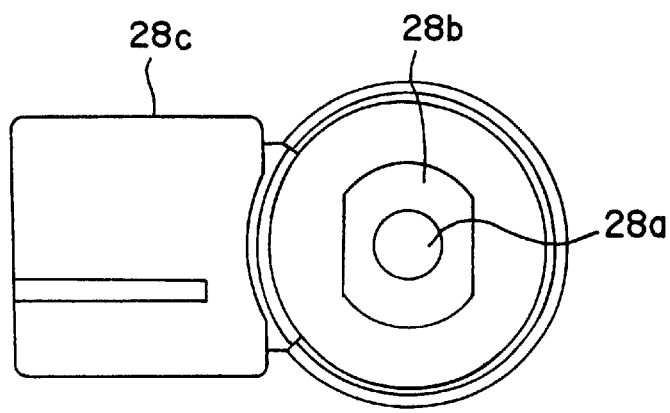
FIG. 11 is a top view of FIG. 10.

FIG. 11 is a top view of the solenoid operated valve 10a' taken from arrow K direction, wherein 28b shows a rotation stopper.

In FIGS. 10 and 11, 28c shows a connector. According to the embodiment of FIG. 10, a solenoid operated valve may be gained having improved magnetic characteristics, and at the same time, having a smaller size and decreased number of members to be assembled.

Figure 12C:
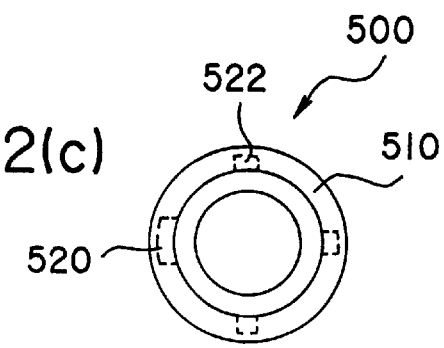
FIG. 12 is an explanatory view showing the structure of the filter.
Figure 12A:
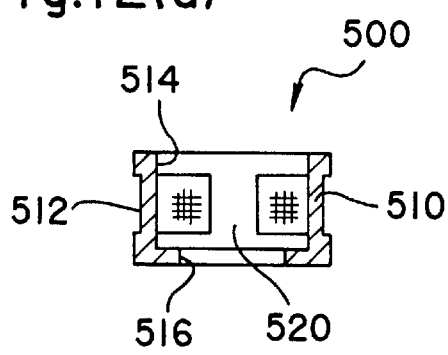
Figure 12B:
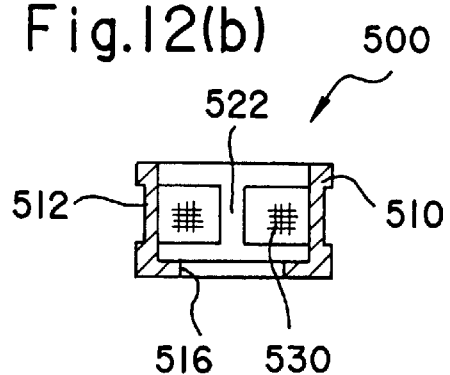
Figure 13:
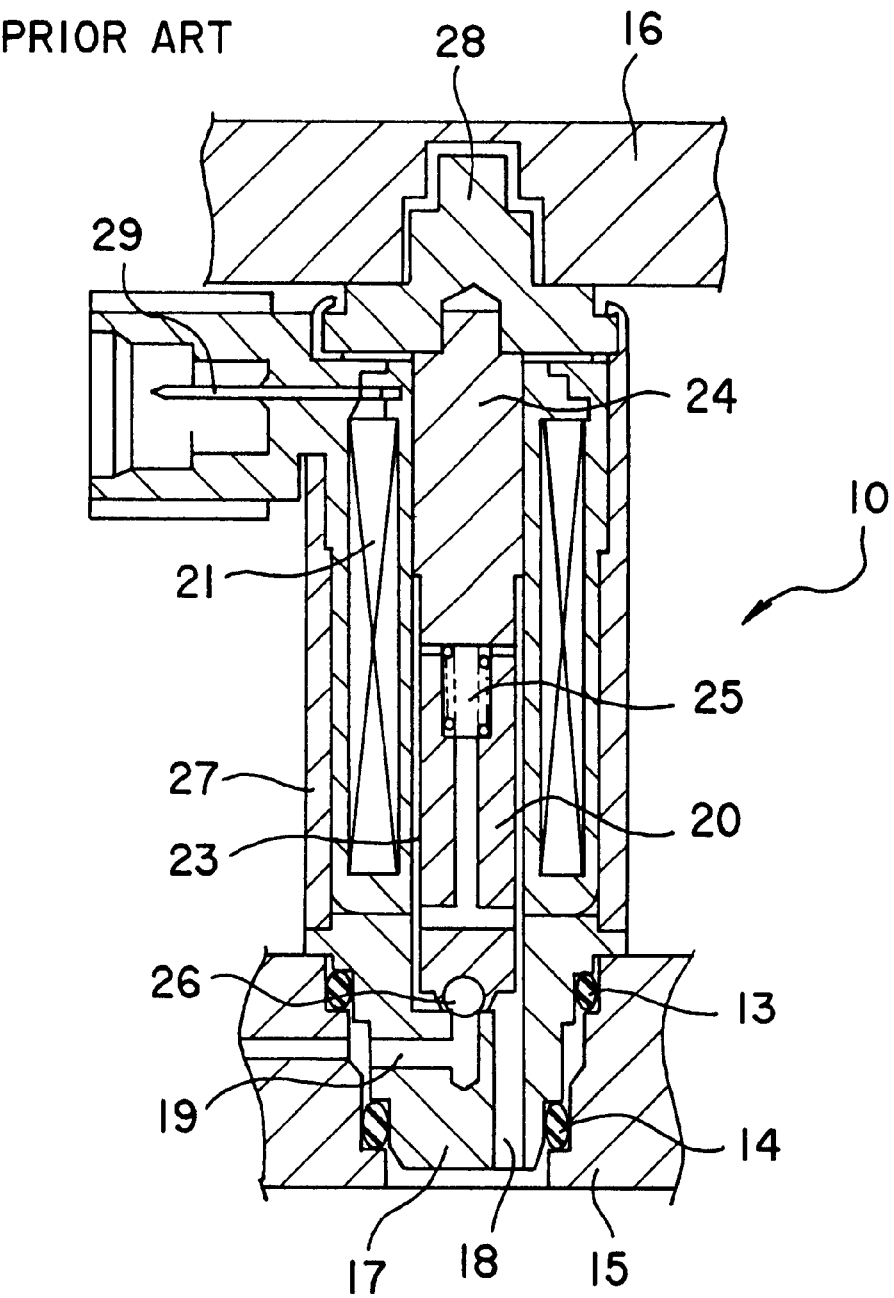
FIG. 13 is a cross-sectional view of the solenoid operated valve according to the prior art.

FIG. 12 is a view showing the details of filter 500.

A filter 500 comprises a cylindrical body 510 made of plastic. A ring-shaped groove 512 is formed to the center area of the outer peripheral of the body 510. One end of the inner circumference of body 510 is formed as a straight-shaped inner bore 514, and the other end of the inner circumference is formed as a small diameter hole 516. The trunk portion of the body comprises an opening supported by posts 520 and 522, and a net member 530 covering the opening is equipped thereto.

When the filter 500 is fit to the pipe sleeve 30, the narrowed portion 516 will come into contact with the step portion 370 of the pipe sleeve 30, and the filter 500 will be fixed to the predetermined position of the pipe sleeve 30.

Since the ring groove 512 is formed to the outer peripheral of the filter body 510, the fluid travelling from the flow-in passage 15a will pass through the ring groove 512 toward the circumferential direction of the filter, and will be guided to the flow-in opening 33 of the pipe sleeve 30 through the net member 530. According to the above structure, the whole region of the net member 530 may be utilized, and clogging may be prevented.

When the valve member 26 rises together with the plunger 31 and opens the valve opening 32 of the pipe sleeve 30, the fluid inside the pipe sleeve 30 will travel through the flow-out passage 15b to the exterior.

As explained above, the solenoid operated valve according to the present invention utilizes a pipe sleeve including a plunger, which also serves as a valve body. The structure of the valve will thus be simplified and the number of members to be assembled is reduced, and sealing members may be omitted.

Further, the cap and the suction element of the present valve is formed integrally, thereby realizing miniaturization of the valve.

Moreover, since the filter is fit directly to the flow-in opening formed to the pipe sleeve, the accuracy of positioning the filter may be improved.

We claim:

1. A solenoid operated valve in which a suction element is attracted by an electromagnetic coil, comprising a body and a plunger pipe being integrally formed as a pipe sleeve to which said suction element is inserted and fixed, and a plunger slidably mounted within said pipe sleeve and including a valve member seated at a bottom end of said plunger, wherein said pipe sleeve is formed by deep drawing to include a bottom portion extending across a bottom end of said pipe sleeve and having an opening defining a valve seat, said valve member cooperating with said valve seat in response to sliding movement of said plunger for opening and closing said valve.

2. A solenoid operated valve according to claim 1, wherein a step portion is formed to said pipe sleeve, said step portion acting as a positioning member for positioning a filter being press-fit to said pipe sleeve.

3. A solenoid operated valve according to claim 2, wherein said step portion formed to said pipe sleeve includes a plural number of steps through which the diameter of said pipe sleeve is gradually reduced.

4. A solenoid operated valve according to claim 1, wherein said plunger comprises a large diameter portion and a small diameter portion, said valve member being placed at the end of said small diameter portion adjacent said valve opening, and a flow-in opening is formed to the side surface of said pipe sleeve corresponding to said small diameter portion.

5. A solenoid operated valve according to claim 4, wherein a filter is mounted about said pipe sleeve to communicate with said flow-in opening.

6. A solenoid operated valve in which a suction element is attracted by an electromagnetic coil, said suction element being integrally formed with a cap, said solenoid operated valve comprising a body and a plunger pipe being integrally formed as a pipe sleeve into which said suction element is inserted and fixed, and a plunger slidably mounted within said pipe sleeve and including a valve member seated at a bottom end of said plunger, wherein said pipe sleeve is formed by deep drawing to include a bottom portion extending across a bottom end of said pipe sleeve and having an opening defining a valve seat, said valve member cooperating with said valve seat in response to sliding movement of said plunger for opening and closing said valve.

7. A solenoid operated valve according to claim 6, wherein said cap being integrally formed with said suction element has a flat upper surface, and to which is formed a concave portion for mounting other devices.

8. A solenoid operated valve according to claim 6, wherein a step portion is formed to said pipe sleeve, said step portion acting as a positioning member for positioning a filter being press-fit to said pipe sleeve.

9. A solenoid operated valve according to claim 8, wherein said step portion formed to said pipe sleeve includes a plural number of steps through which the diameter of said pipe sleeve is gradually reduced.

10. A solenoid operated valve according to claim 6, wherein said plunger comprises a large diameter portion and a small diameter portion, said valve member being placed at the end of said small diameter portion, and a flow-in opening is formed to the side surface of said pipe sleeve corresponding to said small diameter portion.

11. A solenoid operated valve according to claim 10, wherein a filter is mounted to said flow-in opening.

* * * * *